(12) United States Patent
Faerber et al.

(10) Patent No.: US 7,739,285 B2
(45) Date of Patent: Jun. 15, 2010

(54) EFFICIENT HANDLING OF MULTIPART QUERIES AGAINST RELATIONAL DATA

(75) Inventors: Franz X. Faerber, Walldorf (DE); Christian M. Bartholomae, Oftersheim (DE); Erich Marschall, Nussloch (DE); Stefan Dipper, Wiesloch (DE); Guenter Radestock, Karlsruhe (DE)

(73) Assignee: SAP AG, Walldorf (DE)

( * ) Notice: Subject to any disclaimer, the term of this patent is extended or adjusted under 35 U.S.C. 154(b) by 787 days.

(21) Appl. No.: 11/239,720

(22) Filed: Sep. 29, 2005

(65) Prior Publication Data

US 2007/0073658 A1    Mar. 29, 2007

(51) Int. Cl.
*G06F 7/00*    (2006.01)
*G06F 17/30*   (2006.01)

(52) U.S. Cl. .............................. 707/737; 707/999.003; 707/999.01

(58) Field of Classification Search .................... 707/3, 707/10
See application file for complete search history.

(56) References Cited

U.S. PATENT DOCUMENTS

| | | | | |
|---|---|---|---|---|
| 5,890,151 A | * | 3/1999 | Agrawal et al. | 707/5 |
| 6,873,982 B1 | * | 3/2005 | Bates et al. | 707/5 |
| 7,158,966 B2 | * | 1/2007 | Brill et al. | 707/3 |
| 2005/0055363 A1 | * | 3/2005 | Mather | 707/102 |
| 2005/0065955 A1 | | 3/2005 | Babikov et al. | 707/101 |
| 2005/0198076 A1 | * | 9/2005 | Stata et al. | 707/200 |
| 2005/0203888 A1 | * | 9/2005 | Woosley et al. | 707/3 |
| 2005/0240621 A1 | * | 10/2005 | Robertson et al. | 707/102 |
| 2005/0267871 A1 | * | 12/2005 | Marchisio et al. | 707/3 |
| 2005/0289140 A1 | * | 12/2005 | Ford et al. | 707/5 |
| 2006/0179035 A1 | * | 8/2006 | Broker | 707/3 |
| 2006/0195421 A1 | * | 8/2006 | Kilroy | 707/3 |
| 2006/0206512 A1 | * | 9/2006 | Hanrahan et al. | 707/102 |
| 2007/0050347 A1 | * | 3/2007 | Johannes Maria Meijer et al. | 707/4 |

OTHER PUBLICATIONS

Deshpande et al "Caching Multidimensional Queries Using Chunks" ACM SIMOD, 1-26 (1998).
Desphande et al. "Aggregate Aware Caching for Multi-Dimensional Queries" EDBT, (2000).

* cited by examiner

*Primary Examiner*—Cam Y Truong
*Assistant Examiner*—Dung K Chau
(74) *Attorney, Agent, or Firm*—Mintz, Levin, Cohn, Ferris, Glovsky & Popeo, PC

(57) ABSTRACT

A query having multiple parts may be processed to form an intermediate results set. This intermediate results set may be partitioned into a plurality of groups. Thereafter, the groups may be sorted into a plurality of containers so that each container contains data sufficient to calculate one requested result in the multipart query. Related techniques, apparatuses, systems, and computer program products are also described.

14 Claims, 2 Drawing Sheets

EFFICIENT HANDLING OF MULTIPART QUERIES AGAINST RELATIONAL DATA

TECHNICAL FIELD

The subject matter described herein relates to the handling of multipart queries against relational data.

BACKGROUND

Current data warehouse implementations make use of the "group by" functionality offered by standard relational databases in order to simplify computations necessary to generate results requested in a query. However, for some types of data requests, conventional solutions do not represent the requests in a form that facilitates fast and efficient calculation of the requested results.

In particular, for complex multiqueries, data warehouse applications must perform complex processing to represent the queries in a form that a data repository can handle. Moreover, the warehouse applications must subsequently perform further processing of the data repository results to complete the calculation of the requested results to be presented to the user. Such an arrangement has two major drawbacks: users often find the average response times for these queries unsatisfactory, and in worst-case scenarios, answer times for providing results requested in the multiquery may not be defined.

Such disadvantages are illustrated in the following example:

Compare the revenues of (requested results):
Product P1 in the first quarter of 2004
All products in the first quarter of 2004
Product P1 in 2004
Queries:
Select product=P1 AND calday between 20040101 and 20040331, group by quarter
Select calday between 20040101 and 20040331, group by quarter
Select product=P1 AND calday between 20040101 and 20041231, group by year
PART Multiquery:
part0: calday between 20040101 and 20041231 (global restriction)
part1: product=P1 and calday between 20040101 and 20040331
part2: calday between 20040101 and 20040331
part3: product=P1
Conventional database query:

```
calday between 20040101 and 20041231 AND
  ( (product = P1 AND calday between 20040101 and 20040331) OR
    (calday between 20040101 and 20040331) OR
    (product = P1) )
  group by product, quarter
```

In response to the multiquery, the data repository returns an intermediate result set that may be quite large and require extensive further processing in the application to identify data responsive to the requests and to return the requested results to the user. In some cases, the further processing may substantially reduce the size of the intermediate results set which may contain data of an excessively fine granularity as compared to the requested results. This reduction suggests that the database returned more results than necessary, causing excessive network traffic and delaying presentation of the requested results.

SUMMARY

In one aspect, a computer-implemented method of handling a multipart query against relational data may process the multipart query to form an intermediate results set (e.g., a results set containing all of data necessary to respond to the multipart query). The intermediate results set may be partitioned into a plurality of groups (e.g., decomposed into a family of disjoint sets, etc.). These groups may be then be sorted into a plurality of containers so that each container contains data sufficient to calculate one requested result in the multipart query. Once the groups are sorted into the plurality of containers, a final results set may be generated that contains results requested in the multipart query.

The partitioning may comprise mapping attributes requested by the multipart query with parts of the multipart query, and defining the groups based on the mapping of the attributes to the parts of the multipart query. In some variations, in order to reduce processing resource consumption, the intermediate results set may be partitioned into the plurality of groups during a single pass through the intermediate results sets. Similarly, relational data required to generate the intermediate results set may be loaded into a memory device (e.g., RAM).

In another aspect, an apparatus to handle a multipart query against relational data may comprise an input processor, an engine, and an output processor. The input processor is operable to formulate an engine query to generate an intermediate results set. The engine is operable to generate an intermediate results set partitioned according to the plurality of groups. The output processor is operable to sort the groups into a plurality of containers so that each container contains data sufficient to calculate one requested result in the multipart query. Optionally, the apparatus may include or be coupled to a data repository operable to store the relational data. In addition, the apparatus may optionally include or be coupled to a memory device to receive relational data required to generate the intermediate results set.

In an interrelated aspect, a multipart query having defined parts may be received. Thereafter, all relevant attribute values within the multipart query may be classified into parts. These classification results may be used to define a partition of an intermediate results set to be generated. An engine query may be formulated based on the received multipart query so that an intermediate results set obtained from a relational data repository is grouped according to the partition. The groups returned from the relational data repository (within the intermediate results set) may be sorted into defined parts and a resulting output (e.g., final results set) may be provided.

Computer program products, tangibly embodied in information carriers are also described. Such computer program products may cause a data processing apparatus to conduct one or more operations described herein.

Similarly, systems are also described that may include a processor and a memory coupled to the processor. The memory may encode one or more programs that cause the processor to perform one or more of the method acts described herein.

The subject matter described herein provides many advantages. For example, the reformulated multiqueries allow for a more rapid generation of requested results while consuming fewer processing resources as compared to conventional query engines.

DETAILED DESCRIPTION

Figure 1:
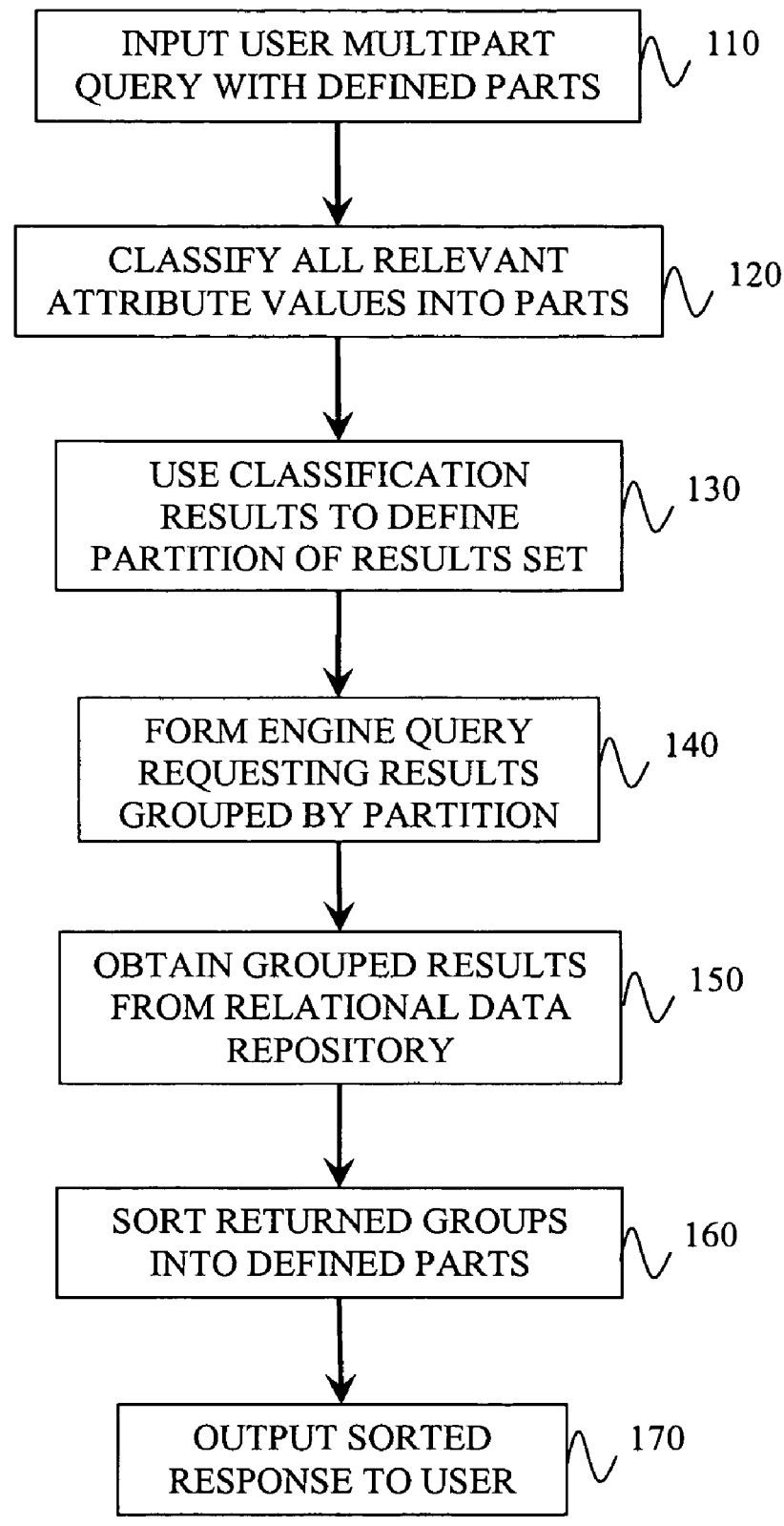
FIG. 1 is a process flow diagram illustrating a method of handling multipart queries against relational data.

FIG. 1 is a process flow diagram of a method 100 for handling a multipart query (e.g., a query that contains multiple parts) against relational data. At 110, a multipart query generated by a user (or other entity/node) and having defined parts is inputted (into, for example, an input processor). Thereafter, at 120, all relevant attribute values within the multipart query are classified into parts. The results of this classification are used, at 130, to define a partition of an intermediate results set responsive to the multipart query. An engine query is formulated, at 140, so that request results are grouped according to the defined partition. Using this engine query, grouped results within an intermediate results set are obtained, at 150, from a relational data repository. At 160, the grouped results returned from the relational data repository are sorted. This sorted response is then, at 170, output to a user (or other entity/node originating the multiparty query).

Figure 2:
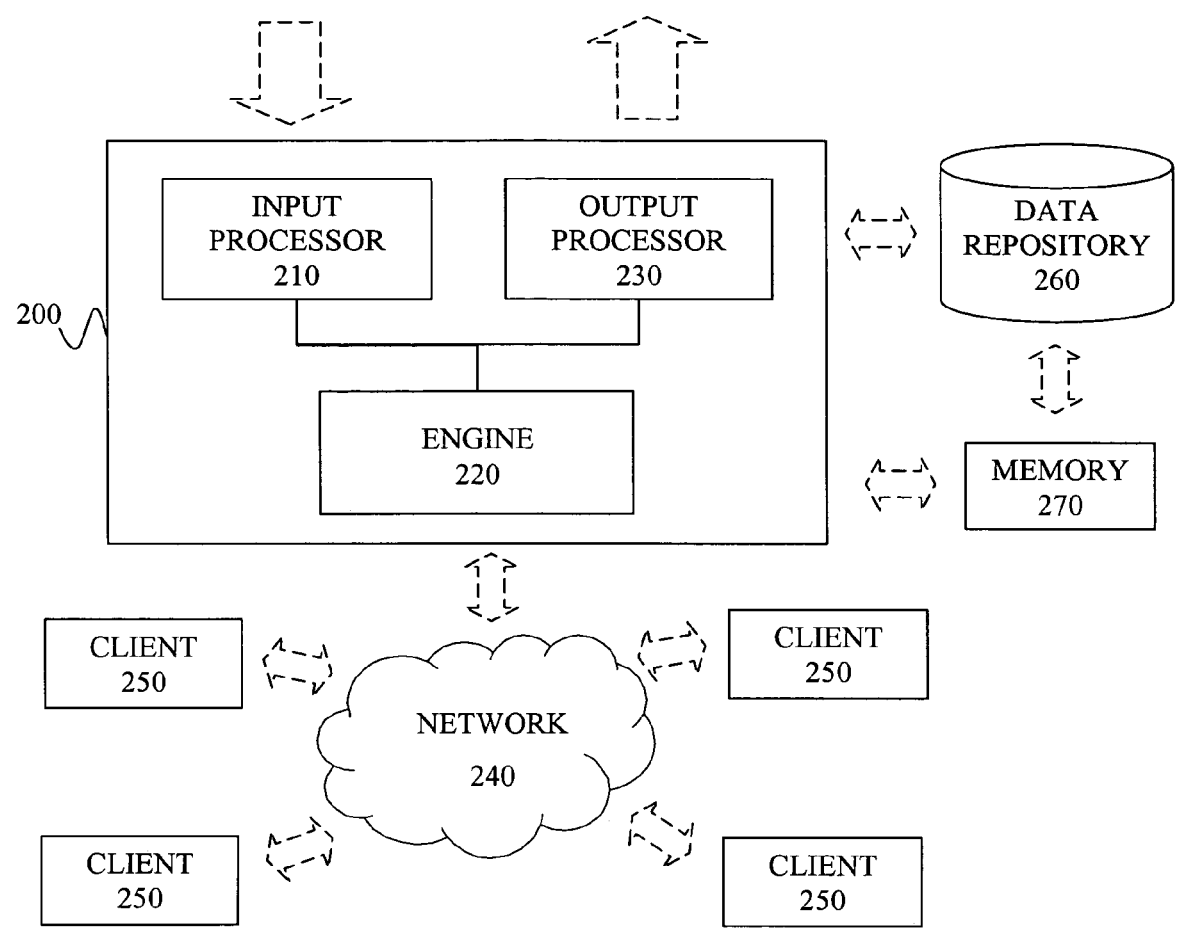
FIG. 2 is a schematic diagram of an apparatus operable to handle multipart queries against relational data.

FIG. 2 illustrates an apparatus 200 to handle a multipart query against relational data (such as the method described in connection with FIG. 1) that comprises an input processor 210, an engine 220, and an output processor 230. The input processor 210 is operable to receive a multipart query generated by a user (or other entity/node) and to convert the multipart query into an engine query having a format compatible with the engine 220. The engine 220 is operable to receive the engine query from the input processor 210 and to generate an intermediate results set. The output processor 230 is operable to obtain the intermediate results set from the engine 220 so that they may be sorted into defined parts and then output to a user (or other originating entity/node).

Optionally, the apparatus 200 may be coupled to a network 240 to allow a plurality of remote clients 250 to periodically access the apparatus 200. In addition, the apparatus 200 may optionally include or be coupled to a data repository 260 which stores the relational data. In other words, the apparatus 200 may reside in an intermediate location between a client 250 and the data repository 260 in order to handle multipart queries. The apparatus 200 and/or the data repository 260 may optionally be coupled to a memory device 270 (e.g., RAM, cache, etc.) into which data necessary to respond to the multipart query may be loaded.

In one variation, data stored within the data repository 260 sufficient to generate results requested in a multipart query is first loaded into the memory device 270 (RAM). A query against the data loaded into the memory device 270 is then reformulated using the technique illustrated in FIG. 1 such that an engine or other unit executing the query does not return an excessively large result set (i.e., a data set with an excessively fine granularity) to an application.

The following provides illustrations which demonstrate the ability of a query engine to respond to complex multipart queries.

Illustration One

Requested Results:

Compare the revenues of:

Product P1 in the first quarter of 2004

All products in the first quarter of 2004

Product P1 in 2004

PART Multiquery:

part0: calday between 20040101 and 20041231 (global restriction)

part1: product=P1 and calday between 20040101 and 20040331 part2: calday between 20040101 and 20040331 part3: product=P1

In one variation, a matrix may be defined for each attribute within the multipart query, with all attribute values as rows and all part functions as columns:

|  | part0 | part1 | part2 | part3 |
|---|---|---|---|---|
| Attribute 1 |  |  |  |  |
| Calday 20040101 | 1 | 1 | 1 | 1 |
| . . . | 1 | 1 | 1 | 1 |
| Calday 20040331 | 1 | 1 | 1 | 1 |
| Calday 20040401 | 1 | 0 | 0 | 1 |
| . . . | 1 | 0 | 0 | 1 |
| Calday 20041231 | 1 | 0 | 0 | 1 |
| Attribute 2 |  |  |  |  |
| Product P1 | 1 | 1 | 1 | 1 |
| Product P2 | 1 | 0 | 1 | 0 |
| . . . | 1 | 0 | 1 | 0 |
| Product Pn | 1 | 0 | 1 | 0 |

For each matrix, regard each row as a binary number and group the rows into different numerical values. Together the respective numerical values define a partition of the result set:

partition1: result→1111 & 1111→{product P1 and first quarter 2004} partition2: result→1001 & 1111→{product P1 and rest of 2004} partition3: result→11111 & 1010→{first quarter 2004 and any other product} partition4: result→1001 & 1010→{rest of 2004 and any other product}

Engine Query:

--- calday between 20040101 and 20041231 AND
( (product = P1 AND calday between 20040101 and 20040331) OR
  (calday between 20040101 and 20040331) OR
  (product = P1) )
    group by partition1..4

---

The grouped results are sorted to containers so that each container contains data sufficient to calculate one of the requested results in the multipart query.

|  | part1 | part2 | part3 |
|---|---|---|---|
| P1, First Quarter 2004 | 1 | 1 | 1 |
| P1, Rest of 2004 | 0 | 0 | 1 |
| All other products, First Quarter 2004 | 0 | 1 | 0 |
| All other Products, Rest of 2004 | 0 | 0 | 0 |

Such a sorting operation is computationally inexpensive and reduces an amount of time needed to provide the requested results. It will be noted that in this illustration, data associated with the group "All other Products, Rest of 2004" was not sorted into any of the containers as such data is not required to provide the requested results.

The grouping functions may be chosen so as to define a partition of the result set. That is, the groups may be pairwise disjoint and together they may cover the entire set. This arrangement ensures that the results may be grouped during a single pass through the intermediate results sets. The grouping functions may collect data across multiple records and groups the results by one or more columns. In addition, the grouping may comprise combining rows within the relational data having related values into elements of a smaller set of rows.

Illustration Two
Requested Results:
For product=P1, return revenues for:
Jan. 1, 2004
Month of January 2004
First quarter 2004
All of 2004
PART Multiquery:
part0: product=P1
part1: calday=20040101
part2: calday between 20040101 and 20040131
part3: calday between 20040101 and 20040331
part4: calday between 20040101 and 20041231
Define Grouping Functions:
partition1: result→{product P1 and Jan. 1, 2004}
partition2: result→{product P1 and Jan. 2-31, 2004}
partition3: result→{product P1 and Feb. 1-Mar. 31, 2004}
partition4: result→{product P1 and Apr. 1-Dec. 31, 2004}
Engine Query:

```
product = P1 AND
  ( (calday = 20040101) OR
    (calday between 20040101 and 20040131) OR
    (calday between 20040101 and 20040331) OR
    (calday between 20040101 and 20041231) )
      group by partition1..4
```

Sorting of grouped results to PART containers:

|  | part1 | part2 | part3 | part4 |
|---|---|---|---|---|
| January 1 | 1 | 1 | 1 | 1 |
| Rest of January | 0 | 1 | 1 | 1 |
| Rest of Q1 | 0 | 0 | 1 | 1 |
| Rest of 2004 | 0 | 0 | 0 | 1 |

With this illustration, the results set is sorted into four groups instead of 366 (for the days of the year), thereby greatly reducing the amount of processing resources required to generate a response to the multipart query. In addition, only groups necessary to provide the requested results are defined. Laboratory testing has demonstrated tenfold improvements in multiquery processing times for certain queries in pre-defined landscapes.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor. A machine-readable storage medium includes magnetic discs optical disks and memory.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In addition, other techniques may be utilized in order to determine how to partition an intermediate results set and/or to sort a grouped intermediate results set. Other embodiments may be within the scope of the following claims.

What is claimed is:

1. A computer-implemented method of handling a multipart query against relational data, the method comprising:
processing, at an engine executed on a processor, the multipart query to form an intermediate results set;
mapping attributes requested by the multipart query with parts of the multipart query;
defining groups based on the mapping of the attributes to the parts of the multipart query;
partitioning the intermediate results set into a plurality of groups based on a matrix including the attributes of the multipart query and the parts of the multipart query and occurring in at least one pass through the intermediate results set;
sorting the groups, based on the matrix, into a plurality of containers so that each container contains data to calculate one requested result in the multipart query, the sorted groups being pairwise disjoint; and
generating a final results set containing results requested in the multipart query based on the groups sorted into the plurality of containers.

2. A method as in claim 1, wherein the plurality of groups are pairwise disjoint.

3. A method as in claim 1, further comprising loading relational data required to generate the intermediate results set into a memory device.

4. A computer-implemented method comprising:
processing, at an engine executed on a processor, a multipart query to form an intermediate results set;
partitioning the intermediate results set into a plurality of groups by mapping attributes requested by the multipart query with parts of the multipart query and by defining the groups based on the mapping of the attributes to the parts of the multipart query, the plurality of groups defined to be pairwise disjoint and defined to provide the requested results, the partitioning being based on a matrix including the attributes of the multipart query and the parts of the multipart query and occurring in at least one pass through the intermediate results set;
sorting, based on the matrix, the groups into a plurality of containers so that each container contains data to calculate one requested result in the multipart query; and
generating a final results set containing results requested in the multipart query based on the groups sorted into the plurality of containers.

5. An apparatus to handle a multipart query against relational data, the apparatus comprising:
a memory;
an input processor to formulate an engine query to generate an intermediate results set, to map attributes requested by the multipart query with parts of the multipart query, and to define groups based on the mapping of the attributes to the parts of the multipart query;
an engine to generate an intermediate results set partitioned according to the plurality of groups and based on a matrix including attributes of the multipart query and parts of the multipart query, the partitioning occurring in at least one pass through the intermediate results set; and
an output processor to sort, based on the matrix, the groups into a plurality of containers so that each container contains data to calculate one requested result in the multipart query, the sorted groups being pairwise disjoint, the output processor further configured to generate a final results set containing results requested in the multipart query based on the groups sorted into the plurality of containers.

6. An apparatus as in claim 5, further comprising a data repository operable to store the relational data.

7. An apparatus as in claim 5, wherein the plurality of groups are pairwise disjoint.

8. An apparatus as in claim 5, wherein the engine is operable to partition the intermediate results set into the plurality of groups during a single pass through the intermediate results set.

9. An apparatus as in claim 5, further comprising a memory device to receive relational data required to generate the intermediate results set.

10. An apparatus as in claim 5, wherein the output processor is further operable to generate a final results set containing results requested in the multipart query based on the groups sorted into the plurality of containers.

11. An apparatus as in claim 10, further comprising a transmitter to transmit the final results set to a remote client over a communications network.

12. A computer program product, tangibly embodied on a machine-readable storage medium, configured to cause a data processing apparatus to:
process the multipart query to form an intermediate results set;
partition the intermediate results set into a plurality of groups by mapping attributes requested by the multipart query with parts of the multipart query, and defining the groups based on the mapping of the attributes to the parts of the multipart query; the partition being based on a matrix including attributes of the multipart query and parts of the multipart query and occurring in at least one pass through the intermediate results set;
sort, based on the matrix, the groups into a plurality of containers so that each container contains data to calculate one requested result in the multipart query, the sorted groups being pairwise; and
generate a final results set containing results requested in the multipart query based on the groups sorted into the plurality of containers.

13. A computer program product as in claim 12, wherein the plurality of groups are pairwise disjoint.

14. A computer program product as in claim 12, wherein the computer program product is further operable to cause a data processing apparatus to:
load relational data required to generate the intermediate results set into a memory device.

* * * * *